Sept. 13, 1932.  W. F. WICHART  1,877,439
OPTICAL INSTRUMENT
Filed May 8, 1929
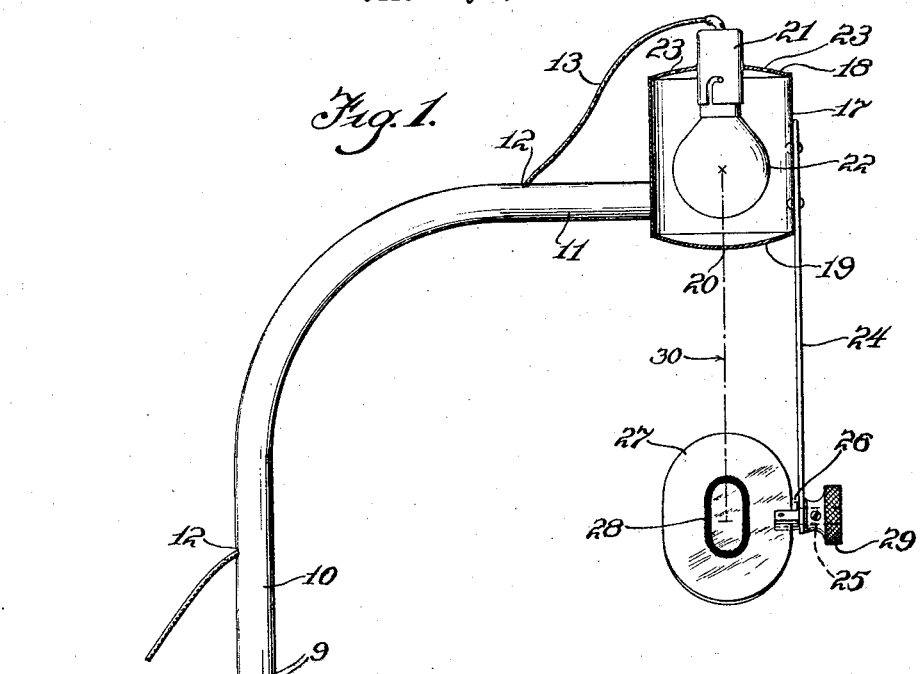
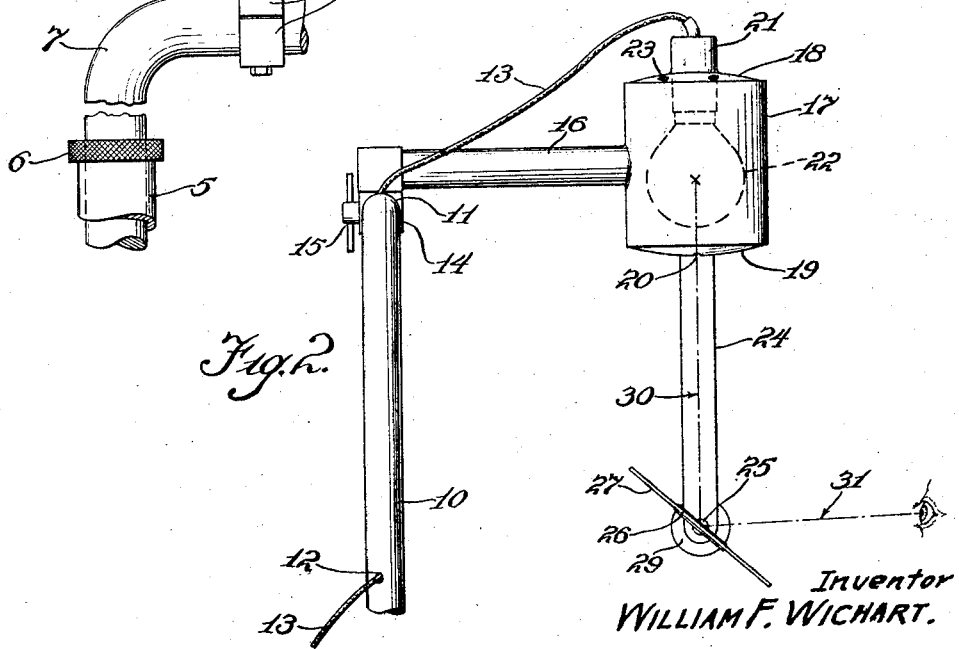
Inventor
WILLIAM F. WICHART.
By E. N. Lundy
ATTY.

Patented Sept. 13, 1932

1,877,439

UNITED STATES PATENT OFFICE

WILLIAM F. WICHART, OF LOS ANGELES, CALIFORNIA

OPTICAL INSTRUMENT

Application filed May 8, 1929. Serial No. 361,314.

My invention relates to an optical instrument or apparatus, and especially to an apparatus that is designed to illuminate the fundus of the human eye for the purpose of inspection, diagnosis, and refraction. The idea of reflecting or directing a light beam into the eye has been used in the form of retinoscope and other optical instruments, but the operator usually holds the instrument in his hand and moves the same around until the beam of light has been directed to the proper place. Usually these devices are so constructed that a movement of the patient's head will alter the illumination within the eye.

By directing a light beam into the eye of the patient from a relatively fixed reflecting surface and having the patient direct his gaze upon the image of the light on the reflector, or upon a point of fixation relative thereto, the eye can be kept in the proper position for examination. In order to do this I have provided a lamp house having a small light aperture in alinement with the lamp filament so that a small light beam is directed outward towards a reflective surface such as a piece of glass and the reflecting surface is capable of being moved to different angles so that the reflected beam may be directed in the proper direction. I prefer to make the reflecting surface of transparent glass and to mark-off thereon a bounded area into which the beam of light is directed and from which it is reflected into the patient's eye. By positioning himself at the opposite side of the apparatus the operator may view the eye through the glass and by moving his head slightly in the various meridians may observe the apparent reflex movement without any of the direct or reflected light entering his eye except such light as may be reflected from the fundus of the eye under inspection. This insures against detraction from the operator's observation.

In operating my instrument I secure a clearer and a better reflex of the retina or fundus than has been possible to secure by the instruments that have heretofore been available. The light beam reflected into the patient's eye is of a steady character, and need not be a bright flashing beam such as heretofore used so that the patient is subjected to a minimum of inconvenience while the eyes are under examination. Also by the use of the present device it is possible for the operator to have both hands free and he does not have to peer through a small aperture in a reflector head held in his hands as at present in vogue. Also the instrument is rigid and fixed so that there is no flickering or movement of the light which is so objectionable in the present retinoscopes. I have also found that the use of my present instrument produces a quicker and more accurate refraction and therefore a more satisfactory refraction than has been secured with the instruments at present on the market.

My invention has numerous objects in view among which are, ease with which the apparatus may be adjusted and used; simplicity of the construction of the instrument; economy in the manufacture and assembly of the same; dependability of operation, and sturdiness of the parts.

I prefer to carry out my invention, and to accomplish the numerous objects thereof, in substantially the manner hereinafter fully described and as more particularly pointed out in the claims, reference being herein made to the accompanying drawings that forms a part of this specification.

In the drawing:—

Figure 1 is a vertical front elevation of my improved optical instrument, a portion thereof being shown in section.

Figure 2 is a vertical side elevation of the device, looking at the left-hand side of Figure 1.

The drawing is to be understood as more or less schematic for the purpose of illustrating a typical or preferred form in which my invention may be made, and in the drawing the same reference characters have been employed to identify like parts wherever they appear throughout the views.

Referring to Figure 1, it will be seen the device is provided with a suitable standard 5 of tubular formation with its upper end screw threaded to receive a knurled clamp ring or nut 6 which is rotated and moved in one direction or the other to tighten or loosen the tube upon the adjacent end of an angular shaped bar 7. This bar, as seen in Figure 1, is substantially L-shaped, its vertical arm being telescopically inserted into the clamp at the upper end of the standard while the horizontal arm extends laterally thereto. The bar 7 may be of any desired dimensions and upon its horizontal arm there is mounted a double or twin-clamp consisting of the jaws 8 that secure the clamp to the horizontal arm of the bar 7 and a pair of clamping-blocks 9 that engage with the lower end of a swinging bracket. This bracket comprises vertical member 10 that extends upwardly from the clamp blocks 9 and is bent laterally to provide a horizontal member 11 in the manner shown in Figure 1. The bracket is hollow or tubular and is provided with apertures 12 to permit the passage of a conductor cable 13 that supplies the electric current to the illuminating element in the lamp-house.

Slidable longitudinally upon the horizontal member 11 is a split block 14 that may be tightened by a thumb screw 15 so that it may be fixed in any position upon the bracket and this block also provides support for lateral arm 16 the adjacent end of which is swiveled or pivotally mounted upon the block so that it may be readily turned in different directions.

A lamp-house having a cylindrical wall 17 is mounted upon the outer end of the arm 16 with the axis of the cylinder vertically disposed and the open ends of the cylindrical wall are closed by an upper plate 18 and the lower plate 19 both of circular form. These plates are dished in cross-section the latter 19 being provided with a light aperture 20 arranged centrally thereof and preferably in axial alinement with the spot of light within the housing. The upper closure plate 18 carries an electric light socket 21 to which the conductors in the cable 13 are connected, and a light bulb or lamp 22 is removably mounted in said socket within the housing. This bulb is preferably of the type used in motor vehicle headlights and has an incandescent filament of condensed form so that what is known as a "spot" of light is provided. If desired the top plate may be provided with vent apertures 23 as shown.

A hanger, in the form of an elongated metal strip 24 is secured pendently to the lamp house and terminates a suitable distance below the latter and its lower end portion is apertured to receive the spindle 25 of the reflector carrying frame, or holder, 26 that is channeled or grooved along its outwardly facing edge to provide a seat of U-shape section in which the adjacent edge of the reflector 27 is mounted. The reflector is preferably a transparent plate of glass of oval or elliptical contour and has its edge cemented or similarly secured in the groove of the holder.

The center of the reflector is provided with a "sight" or viewing zone that is made by marking or otherwise delineating an opaque oval shaped band 28 upon one of the surfaces of the reflector so that the center of the "sight" is alined with the beam of light emitted through the aperture 20 in the lamp house. The threaded spindle 25 protrudes through the aperture in the lower end of the hanger 24 to which it is secured by a thumb nut 29. The mounting of the structure upon the lower end of the hanger is such that sufficient friction is created between the parts so that when the thumb nut is rotated the holder and glass plate will likewise be rotated and will be maintained in the position to which they may be adjusted.

When the device is in use the patient is seated before the apparatus and the arms and brackets of the support are manipulated until the reflector plate is positioned in about the horizontal plane of the patient's eye. The reflector plate is then tilted to the proper angle so that the light beam 30 emitted through the aperture 20 will be directed upon the surface of the plate and the reflected beam 31 will be projected into the eye of the patient. The operator now assumes his position upon the opposite side of the reflector plate from the patient and after sighting the patient's eye through the marked zone on the reflector plate may, by moving his head slightly in the various meridians, for example, up and down, left and right, etc., may observe the apparent reflex action in the patient's eye without any uncomfortable flare in his eyes.

In this position the operator's eyes will be in alinement with the patient's eyes through the "sight" or viewing zone of the reflector plate, and as the latter is made of transparent glass the eyes of the patient may be readily observed by the operator. It is desirable that the incident or direct rays strike the reflecting surface within the "sight" or viewing zone, and the operator in viewing the fundus of the patient's eye may then look through this "sight" to make his examination. The use of the divers brackets and arms permits of universal adjustment of the apparatus so that the reflector plate may be placed in any position to suit the particular patient under examination.

It will be seen from the foregoing that I have provided an optical instrument that is handy to use and is dependable in operation. It is made of simple parts that may be readily fabricated and easily assembled, and there are no parts to get out of order. It will be appreciated the foregoing detailed description and drawing have been given for clearness of understanding only and no unnecessary limitations should be understood therefrom, but the appended claims should be construed as broadly as permissible in view of the prior art.

What I claim is:—

1. An optical instrument comprising a suitable support, a lamp-house carried thereby and having an aperture in its lower wall through which a light beam is projected downwardly, a transparent reflector below and spaced from the lamp-house and disposed transversely across the light beam to change the direction of the latter, a holder secured to and supporting the reflector, and a hanger secured to and depending from said lamp house for pivotally supporting said holder whereby the reflector may be readily positioned at different angles of inclination to the axis of the beam and the illuminated object may be viewed through the reflector.

2. An optical instrument comprising a support, a lamp and casing on the support and disposed out of the line of vision of the patient, a transparent reflector spaced from the lamp and disposed in front of the patient in the light path from the lamp, said reflector adapted to direct the light rays into the eyes of the patient, an apertured diaphragm interposed between the lamp and reflector to provide a relatively narrow beam of light directed to the reflector, a holder secured to said reflector, and a bracket member extending from said casing to said holder and pivotally connected thereto whereby the reflector may be adjusted to different angles of inclination.

3. An optical instrument comprising a support, a lamp and casing on the support and disposed out of the line of vision of the patient, a transparent reflector spaced from the lamp and disposed in front of the patient in the light path from said lamp, said reflector adapted to direct light rays into the eyes of the patient, an apertured diaphragm interposed between the lamp and reflector to provide a relatively narrow beam of light directed to the reflector, a holder secured to said reflector, a bracket member on said lamp-casing and extending towards said reflector, and means pivotally connecting said bracket member to said reflector holder whereby the reflector may be adjusted to different angles of inclination.

Signed at Los Angeles, in the county of Los Angeles, and State of California, this 27th day of April, 1929.

WILLIAM F. WICHART.